United States Patent
Ng et al.

(10) Patent No.: US 7,043,130 B2
(45) Date of Patent: May 9, 2006

(54) FIBER MANAGEMENT APPARATUS

(75) Inventors: Yim Kwong Ng, Nepean (CA); Marcel Naegelkraemer, Ottawa (CA); Simon Shearman, Almonte (CA)

(73) Assignee: Nortel-Networks Limited, Quebec (CA)

( * ) Notice: Subject to any disclaimer, the term of this patent is extended or adjusted under 35 U.S.C. 154(b) by 46 days.

(21) Appl. No.: 10/787,778

(22) Filed: Feb. 26, 2004

(65) Prior Publication Data

US 2005/0191023 A1    Sep. 1, 2005

(51) Int. Cl.
*G02B 6/00* (2006.01)
(52) U.S. Cl. ..................................... 385/135
(58) Field of Classification Search ......... 385/134–137
See application file for complete search history.

(56) References Cited

U.S. PATENT DOCUMENTS

| | | | |
|---|---|---|---|
| 6,210,003 | B1 | 4/2001 | Chan |
| 6,215,942 | B1 * | 4/2001 | DeMeritt et al. ........... 385/136 |
| 6,771,871 | B1 * | 8/2004 | Krampotich et al. ....... 385/134 |
| 6,915,060 | B1 * | 7/2005 | Schlueter et al. .......... 385/137 |

OTHER PUBLICATIONS

Panduit; http://www.panduit.com/products/browse.asp?newrecordset=yes&classlevel=321; Feb. 18, 2004.
Panduit; http://www.panduit.com/products/browse.asp?newrecordset=yes&classlevel=322; Feb. 18, 2004.
Panduit; http://www.panduit.com/products/browse.asp?newrecordset=yes&classlevel=323; Feb. 18, 2004.
Panduit; http://www.panduit.com/products/browse.asp?newrecordset=yes&classlevel=324; Feb. 18, 2004.
Panduit; http://www.panduit.com/products/browse.asp?newrecordset=yes&classlevel=325; Feb. 18, 2004.

* cited by examiner

*Primary Examiner*—Michelle Connelly-Cushwa
*Assistant Examiner*—Chris Chu
(74) *Attorney, Agent, or Firm*—Guerin & Rodriguez LLP; Michael A. Rodriguez

(57) ABSTRACT

A fiber management apparatus. The apparatus has a housing having a top panel, a bottom panel opposite the top panel, a back panel between the top and bottom panels, and a front panel hinged to an edge of the top panel. The front panel rotates between an open position and a closed position. The apparatus also has opposite open ends that are defined by the panels. The open ends allow optical fiber to pass through the housing. The apparatus includes a first cellular element and a second cellular element. The first cellular element is attached to an inner surface of the back panel. The second cellular element is attached to an inner surface of the front panel. The first and second cellular elements cooperate to urge at least one fiber passing through the open ends of the housing between the cellular elements

20 Claims, 5 Drawing Sheets

US 7,043,130 B2

FIBER MANAGEMENT APPARATUS

FIELD OF THE INVENTION

The invention relates generally to fiber management and more specifically to a fiber management apparatus for use in a communication system.

BACKGROUND OF THE INVENTION

Demand for networking services continues to grow; however, the physical deployment space available to house a networking system has become cost restrictive. As such, manufacturers continue to supply more functionality in smaller components. Due to the reduced size of networking components, traditional fiber management techniques and apparatuses are often not useable.

Various solutions exist for providing fiber management for smaller networking components. For example, one solution uses a pair of cylindrical posts disposed within a housing. Other solutions implement VELCRO or a combination of VELCRO and spacers. Another solution includes a foam channel disposed within a housing, which is attached to a circuit pack. Each of these solutions has various shortcomings with respect to certain desirable characteristics for a fiber management system. For example, some of the solutions require a high amount of user dexterity. Others fail to provide a means to preserve a required minimum bend radius of the fiber. Loading and unloading the fibers can also be difficult using some of the aforementioned approaches. Also, concerns related to the possibility of micro-pinching and micro-bending exist for some of the previous solutions.

What is needed is a fiber management system that is able to maintain a minimum bend radius of a fiber, does not require a high amount of user dexterity to implement, and can be loaded and unloaded with ease.

SUMMARY OF THE INVENTION

In one aspect, the invention features a fiber management apparatus that has a housing, a first cellular element, and a second cellular element. The housing has a top panel, a bottom panel opposite the top panel, a back panel between the top and bottom panels, a front panel hinged to an edge of the top panel for rotational movement between an open position and a closed position, and open opposite ends defined by the panels for passing optical fiber therethrough. The first cellular element is attached to an inner surface of the back panel. The first cellular element provides a guide for optical fiber passing through the open ends of the housing. The second cellular element is attached to an inner surface of the front panel. The second cellular element presses against the first cellular element when the front panel is rotated into the closed position thereby urging at least one fiber passing through the open ends of the housing between the cellular elements.

In another aspect, the invention features a fiber management means having a housing means and a restraining means. The housing means has a pair of open ends for receiving a fiber within a volume defined by the housing means. The restraining means is disposed within the housing means. The restraining means maintains a bend radius of the fiber and restrains the fiber to a relatively fixed position within the volume of the housing means.

In yet another aspect, the invention features a communication system having a carrier and a housing. The carrier has a front face and electronic components for providing communication. The housing is attached to the front face and provides fiber management. The housing has a top panel, a bottom panel opposite the top panel, a back panel between the top and bottom panels, a front panel hinged to an edge of the top panel for rotational movement between an open position and a closed position, and open opposite ends defined by the panels for passing optical fiber therethrough. The housing also has a first cellular element attached to an inner surface of the back panel for providing a guide for optical fiber passing through the open ends of the housing. Additionally, a second cellular element is attached to an inner surface of the front panel. The second cellular element presses against the first cellular element when the front panel is rotated into the closed position thereby urging at least one fiber passing through the open ends of the housing between the cellular elements.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
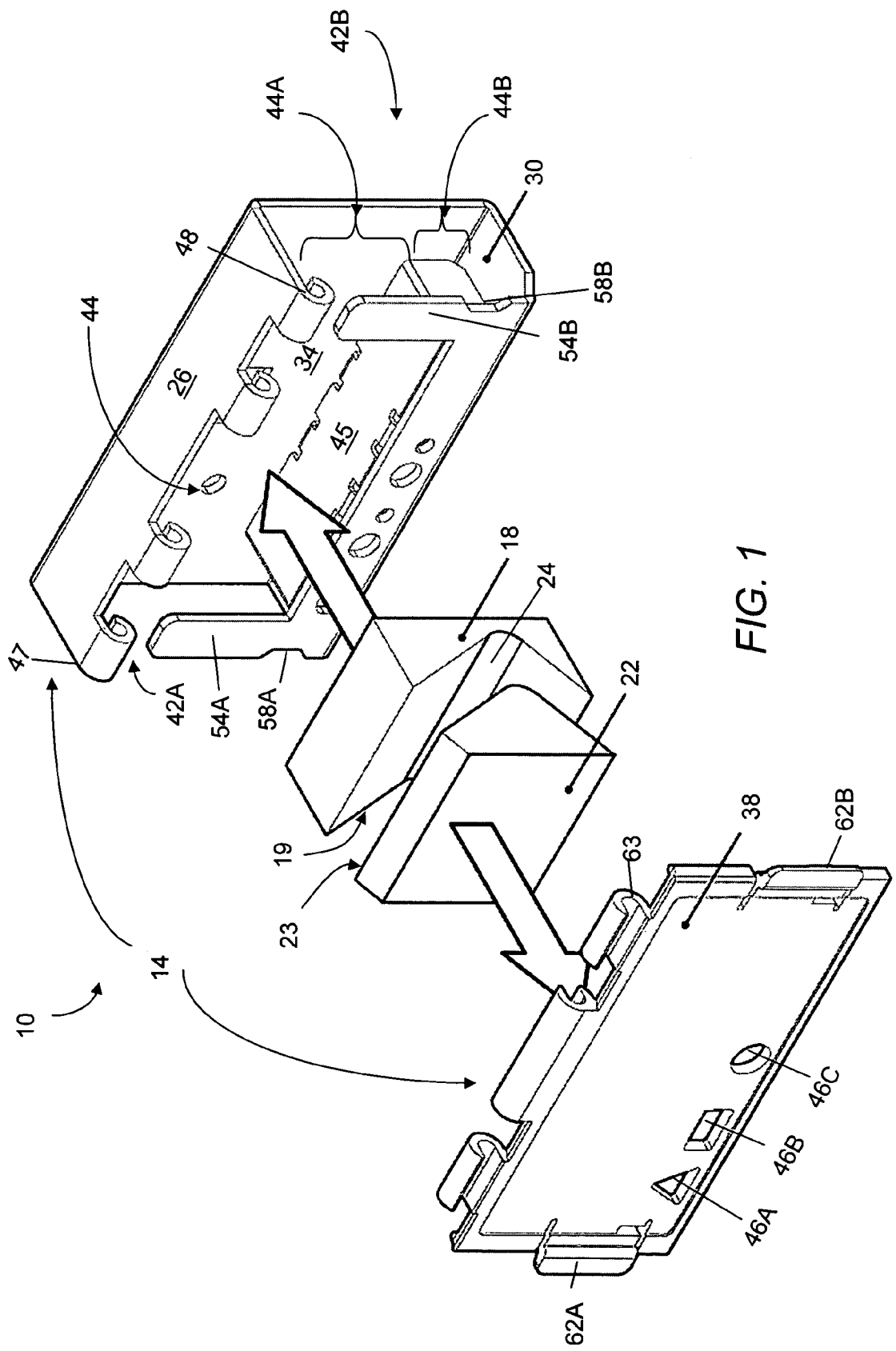
FIG. 1 is an exploded view of an embodiment of a fiber management apparatus constructed according to the principles of the invention.
Figure 2:
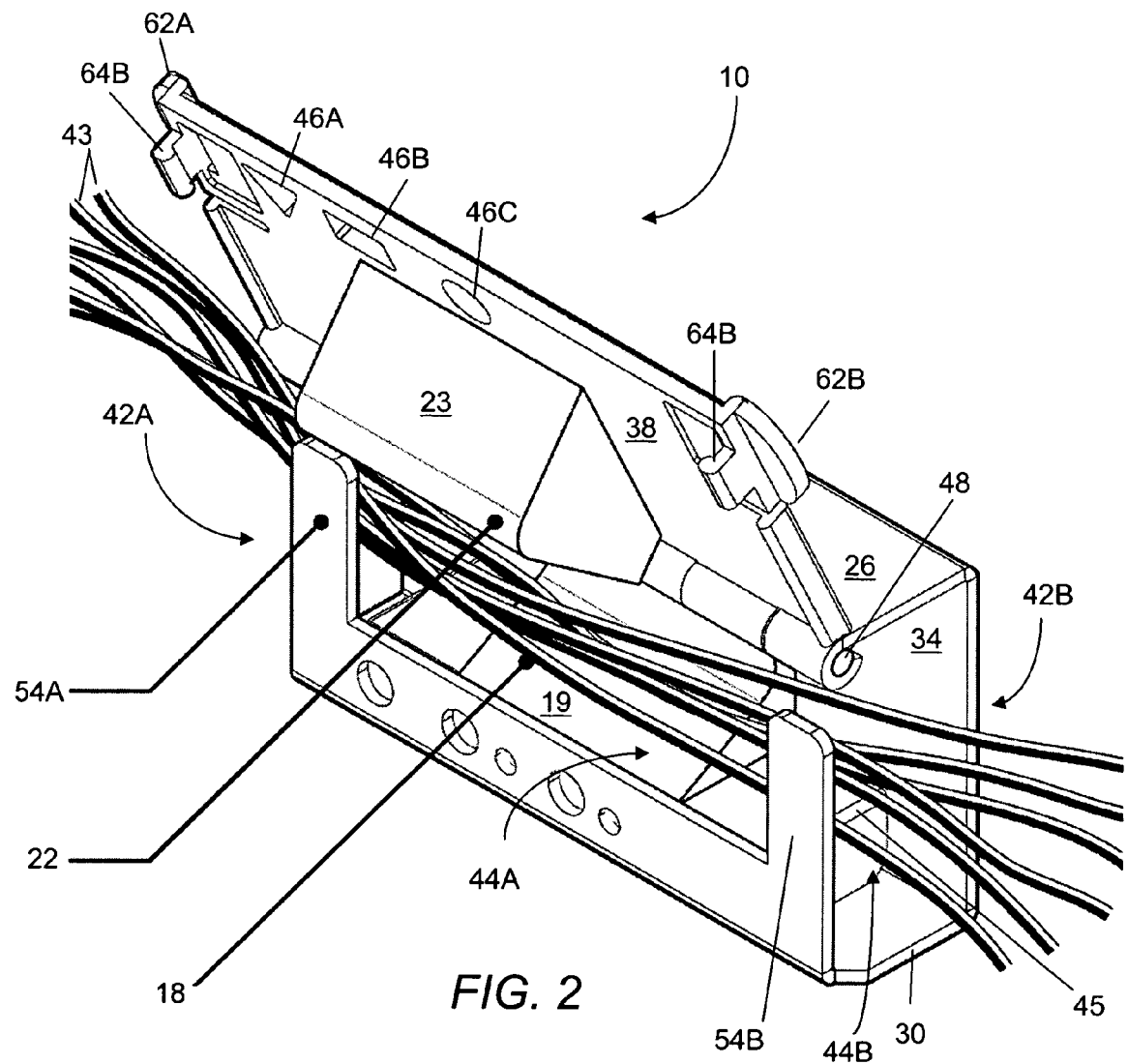
FIG. 2 is an isometric view of the embodiment of the fiber management apparatus of FIG. 1.
Figure 3:
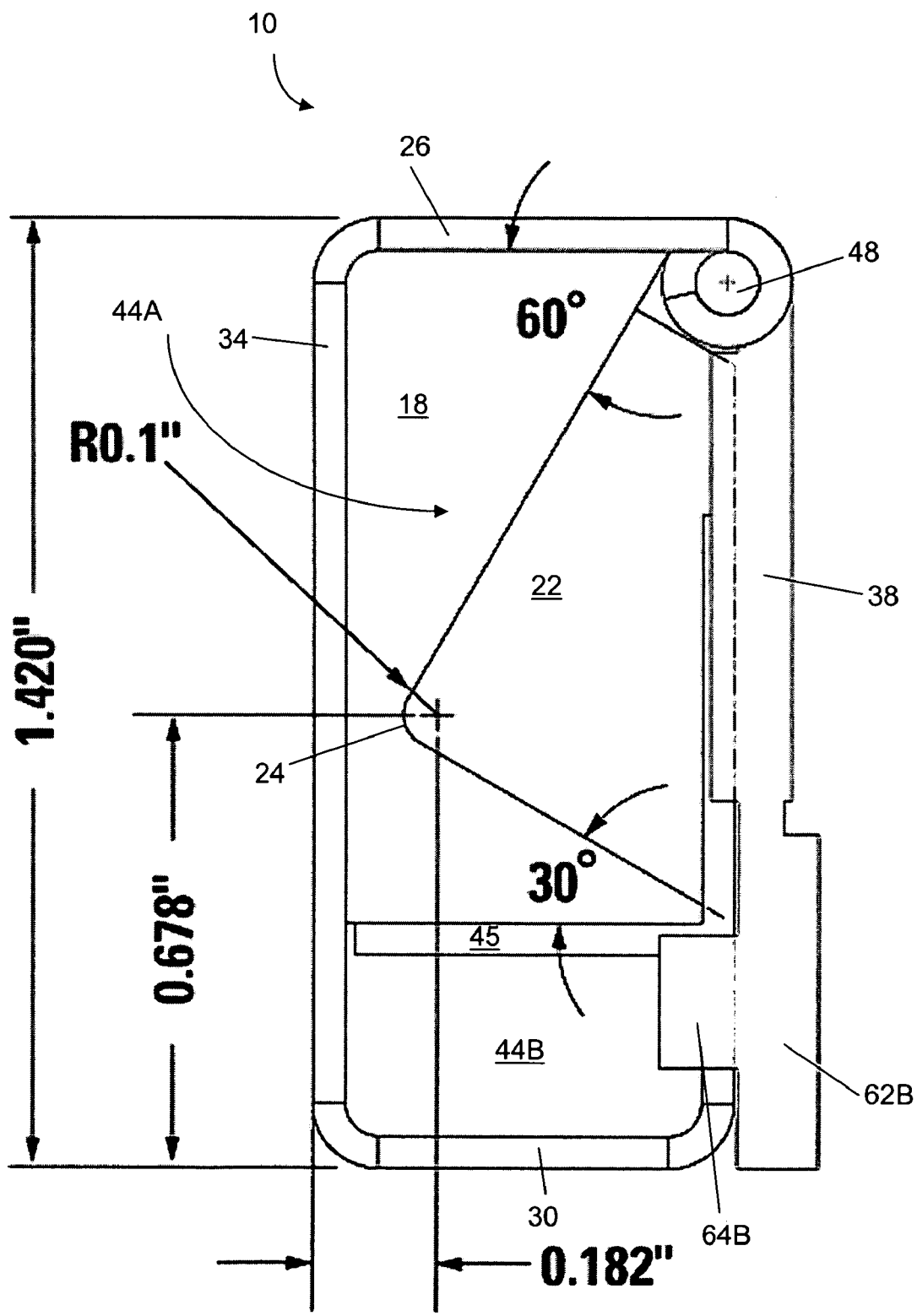
FIG. 3 is a side view showing exemplary dimensions of the embodiment of the fiber management apparatus of FIG. 1

FIGS. 1, 2, and 3 show various features of an embodiment of a fiber management apparatus 10 constructed according to the principles of the present invention. With reference to FIG. 1, the fiber management apparatus 10 includes a housing 14, a first cellular element 18, and a second cellular element 22. The housing 14 includes a top panel 26, a bottom panel 30, a back panel 34, a front panel 38, and pair of open ends 42A, 42B. The top panel 26 is disposed opposite the bottom panel 30. The back panel 34 is disposed between the top panel 26 and bottom panel 30 and connects the top panel 26 to the bottom panel 30. In one embodiment, the top panel 26, the bottom panel 30, and the back panel 34 have a generally C-shaped cross-section. The open ends 42A, 42B provide a path for at least one optical fiber 43 (FIG. 2) to enter and exit the volume 44 defined by the panels of the housing 14. In one embodiment, the housing 14 includes a member 45 displaced within the volume 44 of the housing 14. The member 45 is substantially parallel to the bottom panel 30 and contacts both the back panel 34 and a portion of the bottom panel 30. Having the member 45 within the volume 44 of the apparatus 10 divides the volume 44 into a first volume 44A and a second volume 44B. The second volume 44B can be hollow or filled with a material. In one embodiment, one or more light pipes (not shown)

pass through the second volume 44B through a respective opening 46A, 46B, 46C in the front panel 38. The top panel 26, the bottom panel 30, and the back panel 34 of the housing 14 are constructed of a metal material (e.g., sheet metal) although other materials such as plastic or polymers can be used. The front panel 38 of housing 14 is constructed of plastic to facilitate attachment of the front panel 38 to the rest of the housing 14, as described in more detail below.

The top panel 26 has a front edge 47 (relative to the back panel 34). The front edge 47 is shaped to receive a pin along a length of the front edge 47. For example, as shown, the front edge 47 is curled underneath towards the back panel 34 at a predetermined radius to create a C-shaped channel 48 along the length of the top panel 26. Alternatively, the front edge 47 can be shaped to receive a latch or other attachment mechanism. For example, the front edge 47 can extend substantially perpendicular from the top panel 26 away from the bottom panel 30 for a predetermined distance to create a ledge (not shown).

The bottom panel 30 includes a pair of fiber retainers 54A, 54B (referred to generally as fiber retainer 54). The fiber retainers 54A, 54B extend substantially perpendicular from the bottom panel 30 towards the top panel 26. The fiber retainers 54A, 54B, are disposed at the ends of the bottom panel 30 in close proximity to the open ends 42A, 42B. In other embodiments, the fiber retainers 54A, 54B are displaced from the open ends 42A, 42B towards the center of the housing 14 by a predetermined distance or are formed as an integral piece that extends the entire length of the bottom panel 30 or for a portion of the length of the bottom panel 30. In one embodiment, the fiber retainers 54A, 54B can include a notch 58A, 58B configured to receive a respective tab 62A, 62B of the front panel 38 to hold the front panel 38 in the closed position.

The front panel 38 is connected to the front edge 47 of the top panel 30. The front panel 38 includes a top edge 63 that is shaped complementary to the C-shaped channel 48 of the front edge 47 of the top panel 26. The front panel 38 is rotatably connected to the front edge 47 of the top panel 30 by a pin inserted through the channel 48. The channel 48 and pin provide rotational movement of the top panel 38 between an open position and a closed position. As used herein, closed position means that the front panel 38 is attached to the fiber retainers 54A, 54B of the bottom panel 30. In another embodiment, the front panel 38 includes a latch or other attachment mechanism (not shown) along the top edge 63 shaped to connect to the front edge 47 of the top panel 38. In this embodiment, the latch provides removable attachment of the front panel 38 to the front edge 47 of the top panel 30. Removing or opening the front panel 38 provides access to the volume 44 of the housing 14. When in the closed position, access to the volume 44 of the housing 14 is provided by the open ends 42A, 42B. The tabs 62A, 62B provide a means for opening and closing the front panel 38.

The shape of the first cellular element 18 varies according to the application of the apparatus 10. For example, the first cellular element 18 can have a generally U-shaped cross-section or a generally V-shaped cross-section. The first cellular element 18 includes a front face 19 for contacting the second cellular element 22 or fibers 43 within the first volume 44A. The shape of the second cellular element 22 also varies according to the application of the apparatus 10. For example, the second cellular element 18 can have a generally U-shaped cross-section or a generally V-shaped cross-section. The second cellular element includes a front face 23 for contacting the front face 19 of the first cellular element 18 or fibers 43 within the first volume 44A. In one embodiment, the shape of the second cellular element 22 is complementary to the shape of the first cellular element 18. The first cellular element 18 and second cellular element 22 are made of a foam material. For example, an open cell foam can be used. In other embodiments, a closed cell foam or another material such as rubber is used to form the first cellular element 18 and second cellular element 22.

FIG. 2 shows the first cellular element 18 attached to an inner surface of the back panel 30 and to a top surface of the member 45. The first cellular element 18 is sized to fit within the first volume 44A of the housing 14. The second cellular element 22 is attached to an inner surface of the front panel 38. The second cellular element 22 is also sized to fit within the first volume 44A of the housing 14. Fibers 43 pass through the first volume 44A from open end 42A to open end 42B and lie within the V (or U) of the first cellular element 18 and behind the fiber retainers 54A, 54B when the front panel 38 is in the open position. The fiber retainers 54 keep the fibers 43 within the first volume 44A of the housing 14. The V (or U) of the first cellular element 18 operates to channel, collect, and group the fibers 43 closely together.

Also shown are the tabs 62A, 62B of the front panel 38. Each of the tabs 62A, 62B includes a respective attachment mechanism 64A, 64B. In one embodiment, the attachment mechanisms 64A, 64B are resilient barbs shaped to directly engage the fiber retainers 54A, 54B and secure the front panel 38 in the closed position. In other embodiments, the attachment mechanisms 64A, 64B are hooks or other devices that are attachable to the fiber retainers 54A, 54B themselves or to the notches 58A, 58B of the fiber retainers 54A, 54B.

FIG. 3 depicts exemplary dimensions for the housing 14 and shapes of the first cellular element 18 and the second cellular element 22. In one embodiment, a top section of the front face 19 of the first cellular element 18 descends from the top panel 26 towards the member 45 at an angle of 60° relative to the top panel 26. A bottom section of the front face 19 ascends from the member 45 towards the top panel 26 at an angle of 30° relative to the member 45. The top section and bottom sections meet and form a notch 24 within the first volume 44A. The front face 23 of the second cellular element 22 has complementary angles to the front face 19 of the first cellular element 18. The front face 19 of the first cellular element 18 contacts the front face 23 of the second cellular element 22 when the front panel 38 is in the closed position. In one embodiment, the front face 23 of the second cellular element 22 is slightly larger than the front face 19 of the first cellular element 18. As such, the first cellular element 18 and the second cellular element 22 are in a compressed state when the front panel 38 is closed even when fibers 43 are absent from the first volume 44A. When fibers 43 are present within the first volume 43, they typically rest against the front face 19 of the first cellular element 18 and behind the fiber retainers 54A, 54B.

It is desirable that the material of the first cellular element 18 and the second cellular element 22 be compressible and have a compression-set-resistance greater than a predetermined value. Using a compressible material provides compression forces and friction to the fibers 43, which aid in maintaining a desired bend radius of the fibers 43. In one embodiment, the material is an open cell foam. An open cell foam provides greater friction to the fibers 43 relative to the amount of friction provided by a closed cell foam. The compression-set-resistance is relevant to the usable life of the apparatus 10. A material with a low compression-set-resistance may not return to the original size after being compressed for an extended period of time. For example, thirty-two pairs of fibers 43 can disposed within the volume 44 of the housing 14 at one time. At another time, only one pair of fibers 43 may need to be disposed within the volume 44. If a low compression-set-resistance material is used, the material may remain in a semi-compressed state and not be able to contact the single pair of fibers 43. This is undesirable because the forces and friction provided by the first cellular element 18 and the second cellular element 22 aid in maintaining the bend radius of the fibers 43. In some embodiments, the first cellular element 18 and the second cellular element 22 are incombustible below a specified temperature. A $V_0$ grade foam is used, in some embodiments. In one embodiment, both the first cellular element 18 and the second cellular element 22 are comprised of BISCO foam sold by Rogers Corporation of Rogers, Conn.

Figures 4A, 4B, 4C, 4D:
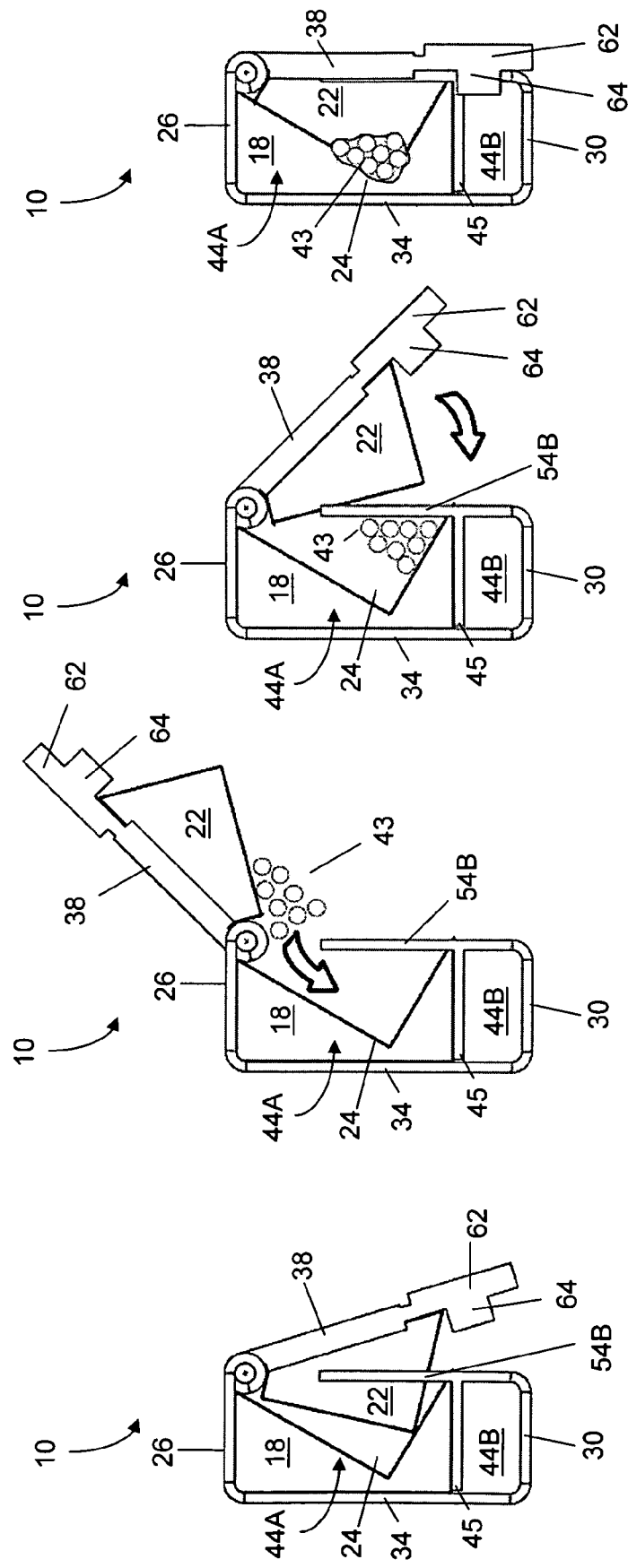
FIGS. 4A, 4B, 4C, and 4D are side views of the embodiment of the fiber management apparatus in various stages of operation.

FIGS. 4A, 4B, 4C, and 4D depict the fiber management apparatus 10 in operation. In FIG. 4A, the front panel 38 is released from the closed position and transitions to the open position. In FIG. 4B, fibers 43 are inserted into the first volume 44A of the housing 14. The fibers 43 contact the first cellular element 18 and are restrained within the first volume 44A by the fiber retainers 54A, 54B. In FIG. 4C, the front panel 38 transitions to the closed position and the second cellular element 22 contacts the fibers 43 urging the fibers 43 up the 30° incline towards the notch 24. In FIG. 4D, when the front panel 38 is in the closed position the fibers 43 are collected into the notch 24 of the first cellular element 18. The first cellular element 18 and the second cellular element 22 compress around the fibers 43, which deform the shape of the front face 19 of the first cellular element 18 and the front face 23 of the second cellular element 22. Urging the fibers 43 against each other provides a resistance to movement because of friction resulting among the fibers 43. The fibers 43 that are in contact with the first cellular element 18 or the second cellular element 22 are subjected to friction and compression. The friction and compression applied by the cellular material aids in maintaining the desired bend radius of the fibers 43.

Figure 5:
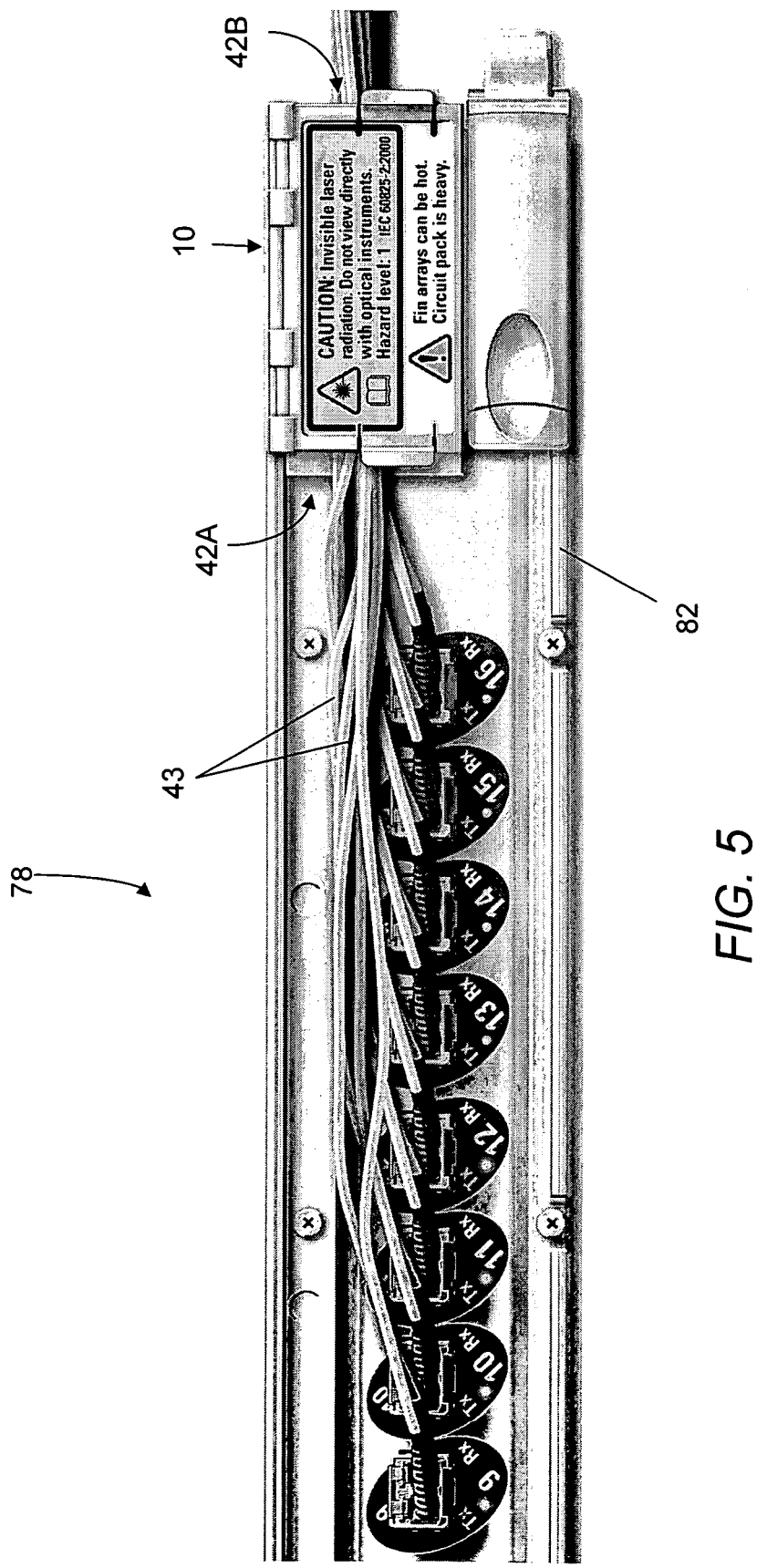
FIG. 5 is a front view of an embodiment of a fiber management apparatus of the present invention disposed on carrier of a networking system.

With reference to FIG. 5, the fiber management apparatus 10 is used in a communication system. A carrier 78 has a front face 82 and includes electronic components that provide communication functionality. The housing 14 attaches to the front face 82 of the carrier 78 at either end of the carrier. The fibers 43 are inserted into the housing 14. The bend radius for each of the fibers 43 is adjusted by a network technician by applying a force to a respective one of the fibers 43. Once the desired bend radius is achieved, the fibers 43, the first cellular element 18, and the second cellular element 22 cooperate to maintain the bend radius of the fibers 43 by providing friction and compression to the fibers 43.

While the invention has been shown and described with reference to specific preferred embodiments, it should be understood by those skilled in the art that various changes in form and detail may be made therein without departing from the spirit and scope of the invention as defined by the following claims.

What is claimed is:

1. A fiber management apparatus, comprising:
    a housing having a top panel, a bottom panel opposite the top panel, a back panel between the top and bottom panels, a front panel coupled to one of the bottom and top panels for rotational movement between an open position and a closed position, and open opposite ends defined by the panels for passing optical fiber therethrough;
    a first compressible member disposed on an interior surface of the back panel for providing a guide for optical fiber passing through the open ends of the housing; and
    a second compressible member disposed on an interior surface of the front panel, the second compressible member urging at least one optical fiber passing through the open ends of the housing against the first compressible member and wedging said at least one optical fiber between the compressible members when the front panel is rotated into the closed position.

2. The apparatus of claim 1, wherein the front panel is an outer front panel, and wherein the housing further comprises an inner front panel extending substantially perpendicular from the bottom panel and opposite to the back panel, a portion of the interior surface of the outer front panel abutting an exterior facing surface of the inner front panel when the outer front panel is rotated into the closed position.

3. The apparatus of claim 2, wherein the outer front panel comprises an attachment mechanism for securing the outer front panel to the inner front panel when the outer front panel is rotated into the closed position.

4. The apparatus of claim 2, wherein the inner front panel includes at least one protruding member for retaining the optical fiber within the housing when the front panel is in the open position.

5. The apparatus of claim 1, wherein the first compressible member is shaped to receive a part of the second compressible member.

6. The apparatus of claim 5 wherein the first compressible member has a generally U-shaped cross-section.

7. The apparatus of claim 5 wherein the first compressible member has a generally V-shaped cross-section.

8. The apparatus of claim 1 wherein the first compressible member and second compressible member are non-combustible.

9. The apparatus of claim 1 wherein the first and second compressible members are comprised of foam.

10. The apparatus of claim 9 wherein the foam is of a type having a compression-set-resistance that enables the foam to return to its original shape when uncompressed after being compressed for an extended period.

11. The apparatus of claim 1, wherein the housing further comprises a planar member extending substantially perpendicular from the back panel and partitioning the housing into first and second volumes, and wherein a portion of the first compressible member is disposed within the first volume on a surface of the planar member.

12. The apparatus of claim 1, wherein the front panel includes at least one opening for emitting light conveyed to the opening by a light pipe.

13. The apparatus of claim 1, wherein the second compressible member has a shape complementary to the shape of the first compressible member.

14. An communication system, comprising:
    a carrier having electronic components for providing communication, the carrier having a front face;
    a housing attached to the front face for providing fiber management, the housing having a top panel, a bottom panel opposite the top panel, a back panel between the top and bottom panels, a front panel coupled to one of the bottom and top panels for rotational movement between an open position and a dosed position, and open opposite ends defined by the panels for passing optical fiber therethrough;

a first compressible member disposed on an interior surface of the back panel for providing a guide for optical fiber passing through the open ends of the housing; and a second compressible member disposed on an interior surface of the front panel, the second compressible member urging at least one optical fiber passing through the open ends of the housing against the first compressible member and wedging said at least one optical fiber between the compressible members when the front panel is rotated into the closed position.

15. The system of claim 14, wherein the first compressible member and second compressible member are non-combustible.

16. The system of claim 14 wherein the first and second compressible members are comprised of foam.

17. The system of claim 14, wherein the second compressible member has a shape complementary to the shape of the first compressible member.

18. A fiber management apparatus comprising:

housing means having a top panel, a bottom panel opposite the top panel, a back panel between the top and bottom panels, a front panel connected to one of the bottom and top panels for rotational movement between an open position and a closed position, and a pair of open ends for receiving a fiber within a volume defined by the housing means;

a first compressible means, disposed on an interior surface of the back panel, for providing a guide for optical fiber passing through the open ends of the housing; and a second compressible means, disposed on an interior surface of the front panel, for urging at least one optical fiber passing through the open ends of the housing against the first compressible means and for wedging said at least one optical fiber between the compressible members when the front panel is rotated into the closed position.

19. The apparatus of claim 18 wherein the first and second compressible means are non-combustible.

20. The apparatus of claim 18 wherein the first and second compressible means comprise foam.

* * * * *